United States Patent Office 2,696,486
Patented Dec. 7, 1954

2,696,486

DISAZO-DYESTUFFS

Raymond Gunst, Binningen, Switzerland, assignor to Ciba Limited, Basel, Switzerland, a Swiss firm No Drawing. Application January 28, 1952,
Serial No. 268,670

Claims priority, application Switzerland February 7, 1951

3 Claims. (Cl. 260—153)

This invention provides new disazo-dyestuffs having a constitution of the type of the product of the formula (1)

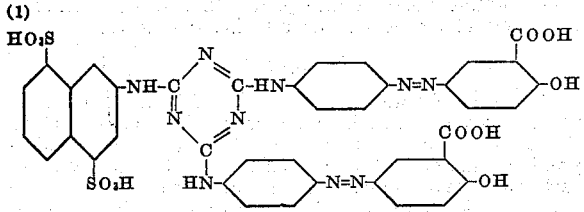

The disazo-dyestuffs of this invention in the form of their free acids correspond to the general formula (2)

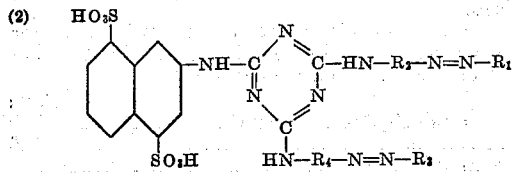

in which $R_1$ and $R_3$ each represent an aromatic radical of the benzene series containing a hydroxyl group and a carboxylic acid group in ortho-position relatively to one another, and $R_2$ and $R_4$ each represent an aromatic radical of the benzene series in which the groups —HN— and —N=N— are in para-position relatively to one another.

These products can be made by condensing 1 molecular proportion of cyanuric chloride or cyanuric bromide with 1 molecular proportion of 2-aminonaphthalene-4:8-disulfonic acid and 2 molecular proportions of the same or 1 molecular proportion of each of two different amino-monoazo-dyestuffs corresponding to the general formula (3)             $R_1—N=N—R_2—NH_2$ in which $R_1$ represents an aromatic radical of the benzene series containing a hydroxyl group and a carboxylic acid group in ortho-position relatively to one another, and $R_2$ represents an aromatic radical of the benzene series in which the groups —$NH_2$ and —N=N— are in para-position relatively to one another.

The amino-monoazo-dyestuffs of the Formula 3 used as starting materials are to a great extent known. They can be made by methods in themselves known, for example, by coupling a diazo compound of an amine of the formula $R_1—NH_2$ (in which $R_1$ has the meaning given above) with an amine of the benzene series capable of coupling in para-position to the amino group. A number of such amino-monoazo-dyestuffs can also be made by coupling a diazo compound of an amine of the benzene series, which contains in para-position to the amino group a substituent convertible into an amino group (for example, a nitro or acetylamino group), with a hydroxy-benzene-ortho-carboxylic acid, and then converting into an amino group the substituent so convertible.

For making these amino-monoazo-dyestuffs there may be used as starting materials, for example, the following compounds:

As diazo compounds of amines of the formula $R_1—NH_2$: 6 - amino-1-hydroxybenzene-2-carboxylic acid-4-sulfonic acid, 4 - amino-1-hydroxybenzene-2-carboxylic acid-6-sulfonic acid and especially 4-amino-1-hydroxy-benzene-2-carboxylic acid.

As amines of the benzene series capable of coupling in para-position to the amino group: Aminobenzene (advantageously coupled in the form of its ω-methane sulfonic acid), 1-amino-3-methylbenzene (advantageously coupled in the form of its ω-methane sulfonic acid), 1-amino-2:5-dimethylbenzene, 1-amino-2- or -3-methoxybenzene, 1-amino-2:5-dimethoxy- or -diethoxybenzene and 1-amino-2-methoxy-5-methylbenzene.

As diazo-compounds of amines containing in para-position to the amino group a substituent convertible into an amino group: 1-amino-4-nitrobenzene, 1-amino-4-nitro-2-chlorobenzene, 1-amino-4-acetylaminobenzene, 1-amino-4-nitrobenzene-2- or -3-sulfonic acid, and 1-amino-4-acetylaminobenzene-2- or -3-sulfonic acid.

As hydroxybenzene-ortho-carboxylic acids capable of coupling: 5- or 6-methyl-1-hydroxybenzene-2-carboxylic acid, 6-chloro-1-hydroxybenzene-2-carboxylic acid and especially 1-hydroxybenzene-2-carboxylic acid.

The reactions necessary for producing the amino-monoazo-dyestuffs may be carried out by methods in themselves known. The coupling of a diazo compound of an amine of the formula $R_1—NH_2$ with an amine of the benzene series capable of coupling in para-position to the amino group is advantageously carried out in an acid, for example, an acetic acid medium, and the coupling of a diazo compound of an amine containing in para-position to the amino group a substituent convertible into an amino group with a hydroxybenzene-ortho-carboxylic acid is carried out, as is known, in an alkaline medium. When the substituent convertible into an amino group is a nitro group, the reduction of the latter group to an amino group must be carried out under conditions such that the azo linkage is not attacked, for example, by reduction with an alkali sulfide or ammonium sulfide.

Especially valuable disazo-dyestuffs are obtained by the process of the invention, for example, from amino-monoazo-dyestuffs which are free from sulfonic acid groups as, for example, in the case of the simplest member of this group of dyestuffs, namely 4-amino-4'-hydroxy-1:1'-azobenzene-3'-carboxylic acid. As further examples of suitable amino-monoazo-dyestuffs there may be mentioned:

4-amino-2 - methyl-5 - methoxy - 4'-hydroxy-1:1'-azobenzene-3'-carboxylic acid, 4 - amino-2:5-dimethoxy-4'-hydroxy-1:1'-azobenzene-3'-carboxylic acid, 4-amino-2:5-dimethoxy-4'-hydroxy - 3' - carboxy-1:1'-azobenzene-5'-sulfonic acid, 4 - amino-2-methyl-5-methoxy-2'-hydroxy-3'-carboxy-1:1'-azobenzene-5'-sulfonic acid and 4-amino-2-chloro-4'-hydroxy-1:1'-azobenzene - 3'-carboxylic acid.

The condensation of the cyanuric halide with 2-amino-naphthalene-4:8-disulfonic acid and the amino-monoazo-dyestuff is advantageously conducted in an aqueous medium. It is desirable to carry out first the condensation with 2-aminonaphthalene-4:8-disulfonic acid and then the condensation with the aminoazo-dyestuff. When 1 molecular proportion of the intermediate condensation product of the cyanuric halide with the aminonaphthalene disulfonic acid is to be condensed with 2 molecular proportions of the same aminoazo-dyestuff, this may be carried out in a single operation. As is customary in the case of condensations with cyanuric halides, both the pH value and the reaction temperature in any given stage of the condensation are higher than those of the preceding stage.

The dyestuffs of the invention are new and correspond to the general Formula 2 given above. They can be used for dyeing or printing a very wide variety of materials such as wool, silk, but especially cellulose materials such as cotton, linen and artificial silk or staple fibers of regenerated cellulose. There are generally obtained yellow dyeings which, as is unexpected with dyestuffs containing the triazine radical, can be discharged pure white with the usual neutral or alkaline discharge printing pastes, which owe their discharging property to the presence of a reducing agent, such for example, as sodium formaldehyde-sulfoxylate.

The disazo-dyestuffs may be treated, for example, in substance or on the fiber, with agents yielding metal, advantageously agents yielding copper, by methods in themselves known.

The following examples illustrate the invention, the

Example 1

18.5 parts of cyanuric chloride finely suspended in water are mixed at 0° C. with a solution containing in 400 parts of water, 30.3 parts of 2-aminonaphthalene-4:8-disulfonic acid (dissolved in the form of its sodium salt) and 21 parts of sodium acetate and having a pH value of 6.0 to 6.5. After stirring for a few minutes at 0° C., there is obtained a clear solution, and the free amine can no longer be detected. A solution of 25.7 parts of 4-amino-4'-hydroxy-1:1'-azobenzene-3'-carboxylic acid and 28 parts of crystalline sodium acetate in 500 parts of water, which has been adjusted to a pH value of at most 8.5 by means of dilute sodium hydroxide solution, is then added, and the whole is heated to 30–35° C. while stirring well, and stirring is continued at this temperature for 3 hours. The pH value, after mixing the two solutions, is about 5.5 and falls in the course of the condensation to a value between 4 and 5. The whole is then heated to 60° C. and a solution (having a pH value of 8.4) in 500 parts of water prepared from 25.7 parts of 4-amino-4'-hydroxy-1:1'-azobenzene-3'-carboxylic acid and 4 parts of sodium hydroxide is added, and the whole is stirred for 2 hours at 90–95° C. The resulting ternary condensation product remains wholly in solution, and the final pH value is about 5.5. By the addition of sodium carbonate the solution is rendered weakly alkaline (pH value of about 8.0), and the condensation product is precipitated by the addition of 10 parts of sodium chloride per 100 parts by volume of reaction mixture, and the product which corresponds to the formula:

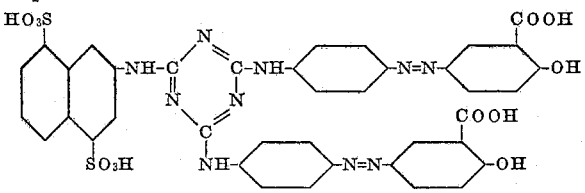

is separated by filtration. It is a yellow-brown powder which dissolves in water with a yellow coloration, and dyes cellulose fibers greenish yellow tints which discharge very well under neutral or alkaline conditions.

Example 2

The primary condensation product from 18.5 parts of cyanuric chloride and 30.3 parts of 2-amino-naphthalene-4:8-disulfonic acid is prepared as described in Example 1. There is then added a solution of 30.1 parts of 4-amino - 5 - methoxy - 2 - methyl - 4' - hydroxy - 1:1'-azobenzene-3'-carboxylic acid and 35 parts of crystalline sodium acetate in 500 parts of water while stirring, the solution having been adjusted to a pH value of 7.5 by the addition of sodium-hydroxide solution, and the whole is heated to 30–35° C. and stirring is continued at that temperature for 3 hours. The ternary condensation product is then prepared by further condensation with 25.7 parts of 4-amino-4'-hydroxy-1:1'-azobenzene-3'-carboxylic acid in the manner described in Example 1. The product is precipitated, separated by filtration and dried. It is a yellow powder which dissolves in water with a yellow coloration and dyes cellulose fibers yellow tints which discharge very well.

By using for the third stage of the condensation, as in the case of the second stage, 30.1 parts of 4-amino-5-methoxy-2 - methyl - 4' - hydroxy - 1:1' - azobenbene - 3'-carboxylic acid a similar dyestuff is obtained which dyes cellulose fibers somewhat more reddish yellow tints which discharge well.

Example 3

The primary condensation product from 18.5 parts of cyanuric chloride and 30.3 parts of 2-aminonaphthalene-4:8-disulfonic acid is prepared in the manner described in Example 1. There is then added while stirring a solution of 38.1 parts of 4-amino-5-methoxy-2-methyl - 4' - hydroxy - 3' - carboxy - 1:1' - azobenzene-5'-sulfonic acid and 35 parts of crystalline sodium acetate in 400 parts of water, the solution having been adjusted to a pH value of 7.2 by the addition of sodium hydroxide, and the whole is heated at 30–35° C., whereupon a clear solution is obtained in a short time. The whole is stirred for 3 hours at 30–35° C. The pH value of the solution must be between 4 and 5. The temperature is raised to 60° C., and a ternary condensation product is prepared by further condensation with 25.7 parts of 4-amino-4'-hydroxy-1:1'-azobenzene-3'-carboxylic acid as described in Example 1. The resulting dyestuff which corresponds to the formula:

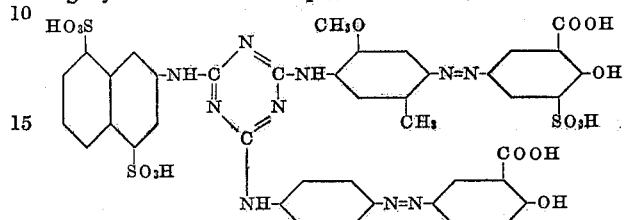

dyes cellulose fibers neutral yellow tints which discharge very well under neutral or alkaline conditions.

Example 4

100 parts of cotton are entered at 50° C. into a dyebath, which contains in 3000 parts of water 1 part of the dyestuff obtainable as described in the first paragraph of Example 1 and 2 parts of anhydrous sodium carbonate. The temperature is raised to 90° C. in the course of ½ hour, and 30 parts of crystalline sodium sulfate are added. Dyeing is then carried on for one hour at 90–95° C. and a pure greenish yellow dyeing is obtained.

On cotton dyed in this manner a pure white discharge print can be produced with the alkaline discharge printing paste of the following composition:

| | Parts |
|---|---|
| Sodium formaldehyde-sulfoxylate | 200 |
| Water | 120 |
| British gum thickening 1:1 | 550 |
| Potassium carbonate | 80 |
| Glycerine | 50 |
| | 1000 |

After printing and drying the material it is steamed for 8 minutes in a Mather-Platt apparatus at 100–102° C., and then rinsed for 10 minutes in cold water and dried.

What is claimed is:

1. A disazo dyestuff of the formula

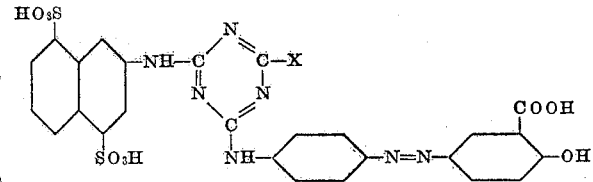

wherein X represents a member selected from the group consisting of radicals of the formulae

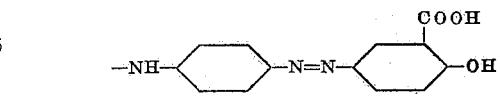

and

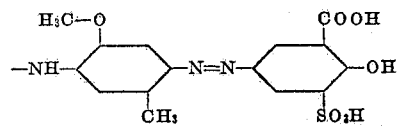

2. The disazo dyestuff of the formula

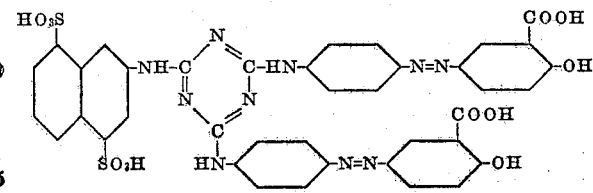

3. The disazo dyestuff of the formula
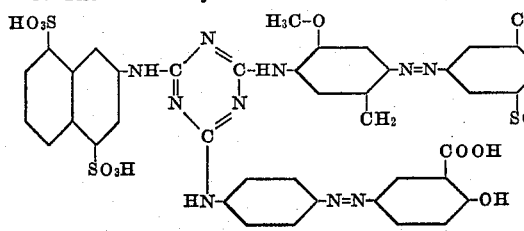
References Cited in the file of this patent
UNITED STATES PATENTS
| Number | Name | Date |
|---|---|---|
| 2,387,997 | Kaiser | Oct. 30, 1945 |
| 2,460,618 | Bernasconi | Feb. 1, 1949 |